(12) United States Patent
Zhong et al.

(10) Patent No.: US 8,293,300 B2
(45) Date of Patent: Oct. 23, 2012

(54) ANHYDROUS FLAVOR DELIVERY COMPOSITION AND METHOD

(75) Inventors: Yuanzhen Zhong, Wayne, NJ (US); Peter Given, Ridgefield, CT (US); Colin Ringleib, Thornwood, NY (US); Nick Feuerstein, Jamaica Estates, NY (US)

(73) Assignee: Pepsico, Inc., Purchase, NY (US)

( * ) Notice: Subject to any disclaimer, the term of this patent is extended or adjusted under 35 U.S.C. 154(b) by 1604 days.

(21) Appl. No.: 11/344,469

(22) Filed: Jan. 31, 2006

(65) Prior Publication Data

US 2007/0178206 A1 Aug. 2, 2007

(51) Int. Cl.
*A23L 1/222* (2006.01)
(52) U.S. Cl. .................. 426/534; 426/651; 426/654
(58) Field of Classification Search .................. 426/534, 426/650, 651, 654
See application file for complete search history.

(56) References Cited

U.S. PATENT DOCUMENTS

| 6,444,253 | B1 * | 9/2002 | Conklin et al. | 426/651 |
| 2004/0086619 | A1 * | 5/2004 | Zhong et al. | 426/590 |

FOREIGN PATENT DOCUMENTS

| EP | 1077034 | 2/2001 |
| JP | 2006136230 | 6/2006 |
| WO | 2004023900 | 3/2004 |

OTHER PUBLICATIONS

Examination report in related Indian Patent Application No. 1771/MUMNP/2008 dated Dec. 27, 2010.

* cited by examiner

*Primary Examiner* — Nikki H Dees
(74) *Attorney, Agent, or Firm* — Banner & Witcoff, Ltd.

(57) ABSTRACT

An anhydrous flavor delivery composition comprising a water-insoluble component, a surfactant and an alcohol is provided. In addition, a method of making the anhydrous flavor delivery composition and a method of flavoring a beverage are provided.

25 Claims, No Drawings

ANHYDROUS FLAVOR DELIVERY COMPOSITION AND METHOD

FIELD OF THE INVENTION

The present invention relates to flavor delivery compositions and methods for making such compositions and for flavoring beverages. More particularly, the present invention relates to anhydrous flavor delivery compositions and methods for flavoring beverages.

BACKGROUND OF THE INVENTION

Flavor delivery compositions are typically used in the beverage industry to incorporate water-insoluble flavor components into water-based beverages. Traditional flavor delivery compositions commonly used are emulsions, extracts and solutions.

Emulsions are thermodynamically unstable and can separate as a result of long-term storage. In a finished beverage, the separation will result in creaming, ringing, sedimentation, flocculation, coalescence, or other undesirable characteristics. In addition, the droplet size of the oil component is too large to make optically clear beverages.

Unlike emulsions, extracts can be used to make optically clear beverages. However, the process of extraction is very slow usually requiring several days to complete the phase separation. In addition, only a small amount (about 5%) of the oil used is recovered for beverage applications while the rest is either discarded or used in low-profit products. Overall, extraction is a wasteful and expensive flavor delivery composition.

A need exists for flavor delivery compositions that are stable, optically clear, efficient, and cost effective.

SUMMARY OF THE INVENTION

In accordance with one aspect of the present invention, an anhydrous flavor delivery composition is provided. The anhydrous flavor delivery composition comprises a water-insoluble component, a surfactant and an alcohol. The anhydrous flavor delivery composition of the present invention can be a stable and optically clear flavor delivery composition than can be readily incorporated into beverage concentrates, beverage syrups and finished beverages.

The water-insoluble component is typically composed of one or more edible oils and is present in an amount from about 1% to about 40%, preferably from about 13% to about 23% by total weight of the anhydrous flavor delivery composition. The edible oil can contain a carrier oil such as triacylglycerol fat/oil, an essential oil, a terpene-based oil, or a combination thereof. In addition, the water-insoluble component can include a non-aqueous organic solvent such as propylene glycol, ethanol, benzyl alcohol, methanol, triacetin, limonene, citrus terpenes, other non-aqueous organic solvents as is known to those skilled in the art, and combinations thereof. The essential oils include flavoring aromatic compounds and/or oils, oleoresins and extracts derived from plants, leaves, flowers, vegetables, fruits and so forth, and combinations thereof. These flavoring oils may be used individually or in a mixture as is well known in the art. Artificial or synthetic forms of these flavoring oils can also be used.

The surfactant is typically present in an amount from about 10% to about 40%, and preferably from about 10% to about 20% by total weight of the anhydrous flavor delivery composition. Non-limiting examples of suitable surfactants include propylene glycol alginate, monoglyceride, diglyceride, dioctyl sulfosuccinate sodium (DOSS), polyoxyethylene (20) sorbitan monolaurate (also known as polysorbate 20, available under the trade name Tween® 20 from ICI Americas, Inc. of Wilmington, Del.), polyoxyethylene (20) sorbitan monopalmitate (also known as polysorbate 40, available under the trade name Tween® 40 from ICI Americas, Inc.), polyoxyethylene (20) sorbitan monostearate (also known as polysorbate 60, available under the trade name Tween® 60 from ICI Americas, Inc.), polyoxyethylene (20) sorbitan tristearate (also known as polysorbate 65, available under the trade name Tween® 65 from ICI Americas, Inc.), polyoxyethylene (20) sorbitan monooleate (also known as polysorbate 80, available under the trade name Tween® 80 from ICI Americas, Inc.), sorbitan monolaurate (available under the trade name Span® 20 from ICI Americas, Inc.), sorbitan monopalmitate (available under the trade name Span® 40 from ICI Americas, Inc.), betaine, sucrose esters of fatty acids, sucrose monomyristate, sucrose palmitate, sucrose stearate, mono and diglycerides of fatty acids, monoglyceride monooleate, monoglyceride monolaurate, monoglyceride monopalmitate, lecithin, diglyceride mixtures, citric acid esters of mono and diglycerides of fatty acids, acetic acid esters of mono and diglycerides of fatty acids, lactic acid esters of mono and diglycerides of fatty acids, mono and diacetyl tartaric esters of mono and diglycerides of fatty acids, polyglycerol esters of fatty acids, cyclodextrins ($\alpha$, $\beta$, or $\gamma$), propylene glycol esters of fatty acids, stearoyl lactylates, $C_{8-18}$ free fatty acids, other emulsifiers as is known to those skilled in the art, and combinations thereof.

The alcohol of the present invention is typically present in an amount from about 55% to about 85%, preferably from about 63% to about 73% by total weight of the anhydrous flavor delivery composition. The preferred alcohol is ethanol. In addition, other alcohols that can be used include, without limitation, isopropanol; benzyl alcohol; methanol; propylene glycol (as $CH_2OH—CH_2—CH_2OH$ and/or $CH_3—CHOH—CHOH$); butylene glycol; hexylene glycol; glycerol; $C_5$-$C_{12}$ mono- and di-saccharide sugars, such as, dextrose, sucrose, fructose, as such, or in other forms such as molasses, brown sugar, invert sugar, refinery syrup, corn syrup; and sugar alcohols such as sorbitol, xylitol and mannitol.

In another embodiment of the present invention, the anhydrous flavor delivery composition can include an effective amount of a suitable preservative. Any suitable preservative can be used. Non-limiting examples of suitable preservative include benzoate salts, sorbate salts, as well as other preservatives known to those skilled in the art, and combinations thereof. Those skilled in the art will appreciate that the preservative can be combined with an acid such as citric acid to lower its pH improving the effectiveness of the preservative.

In accordance with another aspect of the present invention, a method of making an anhydrous flavor delivery composition is provided. Preferably, the components and amounts in the resulting flavor delivery composition are as previously described. The method comprises adding a water-insoluble component to a surfactant to form a mixture. Then, an alcohol is added to the mixture to form an anhydrous flavor delivery composition. Preferably, the anhydrous flavor delivery composition is optically clear and stable.

In accordance with yet another aspect of the present invention, a method of flavoring a beverage composition is provided. The method comprises combining a water-insoluble component, a surfactant, and an alcohol to form an anhydrous flavor delivery composition. Preferably, the components and amounts of the flavor delivery composition are as previously described.

In one embodiment of the present invention, the resulting beverage composition is stable and optically clear.

DETAILED DESCRIPTION OF THE INVENTION

In accordance with one aspect of the present invention, an anhydrous flavor delivery composition is provided. The anhydrous flavor delivery composition comprises a water-insoluble component, a surfactant and an alcohol. The anhydrous flavor delivery composition of the present invention is preferably an optically clear and stable flavor delivery composition than can be readily incorporated into beverage concentrates, beverage syrups and finished beverages.

As used herein, the term "clear" refers to optical clarity, i.e., a liquid composition that has no turbidity as viewed by eye or by instrumental measurement of haze or opacity. In addition, a resulting beverage concentrate, beverage syrup and/or the finished beverage are clear as evidenced by a reading by a HACH Turbidimeter (available from Hack Company of Loveland, Colo.) of around 1 NTU (Nephelometric Turbidity Units) and not more than 3 NTU. When such a reading is as high as around 5 to 10 NTU, a sample is not clear, but rather slightly hazy or very slightly hazy.

As used herein, the term "stable" refers to liquid compositions in which no phase separation occurs, i.e., no creaming, ringing, sedimentation, flocculation, coalescence, crystallization, haziness, or oil-off at 40° F., 70° F., 90° F., and 110° F. over a period of 4 weeks and, more preferably, over a period of more than 6 months, i.e., within the typical shelf-life of a finished beverage.

The water-insoluble component is typically composed of one or more edible oils and is present in an amount from about 1% to about 40%, preferably from about 13% to about 23% by total weight of the anhydrous flavor delivery composition. The edible oil can contain a carrier oil such as triacylglycerol fat/oil, an essential oil, a terpene-based oil, or a combination thereof. In addition, the water-insoluble component can include a non-aqueous organic solvent such as propylene glycol, ethanol, benzyl alcohol, methanol, triacetin, limonene, citrus terpenes, other non-aqueous organic solvents as is known to those skilled in the art, and combinations thereof. The essential oils include flavoring aromatic compounds and/or oils, oleoresins and extracts derived from plants, leaves, flowers, vegetables, fruits and so forth, and combinations thereof.

Table 1 below provides a non-limiting list of sources of essential oils that can used in the present invention. In addition to those essential oils listed below in Table 1, other flavoring oils such as coffee, tea, cherry, apple, pineapple and vanilla oils can be used. These flavoring oils may be used individually or in a mixture as is well known in the art. Artificial or synthetic forms of these flavoring oils can also be used.

TABLE 1

Angelica (*Angelica archangelica*)
Anise (*Pimpinella anisum*)
Star Anise (*Illicium verum*)
Basil (*Ocimum basilicum*)
Reunion Basil (*O. basilicum*)
East Indian Basil (*O. gratissimum*)
Halry Basil (*O. canum*)
Bay (*Laurus nobilis*)
West Indies BAY (*Pimenta Racemosa*)
Bay Rum Tree (*Pimenta racemosa*)
Allspice (*P. dioica*)
Benzoin (*Styrax benzoin*)

TABLE 1-continued

Balsam of Tolu (*Myroxylon balsamum*)
Balsam of Peru (*M. balsamum* var. *Pereirae*)
Styrax (*Liquidamber orientalis*)
Bergamot (*Citrus bergamia*)
Birch (*Betula lenta*)
White Birch (*B. alba*)
Wintergreen (*Gaultheria procumbens*)
Calendula (*Calendula officinalis*)
Marigold (*Tagetes minuta* and *T. patuh*)
Caraway (*Carum carvi*)
Cardamom (*Elettaria cardamomum*)
Carrot Seed (*Daucus carota*)
Caulophyllum Inophyllum
Cedarwood (*Cedrus species*)
Moroccan Cedar (*C. Libani*)
Atlas Cedar (*C. atlantica*)
Tibetan Cedarwood (*C. deodara*)
Thuja (*Thuja occidentalis*)
CeJery (*Apium graveolens*)
Chamomile, German (*Matricaria recutita*, formerly *M. chamomilla*)
Chamomile, Roman (*Chamaemelum nobile*, formerly *Anthemis nobilus*)
English Camomile (*Anthemis nobils*)
Ormenis (*Chamaemelum mixtum*, formerly *Anthemis mixta* and sometimes *Ormenis mixta* or *O. multicaulis*)
Artemisia Arborescens (*Artemisia rborescens*)
Cinnamon (*Cinnamomum zeylanicum*)
Cassia (*C. cassia*)
Ceylon Cinnamon (*C. verum*)
Camphor (*C. camphora*)
Borneo (*Borneol*) Camphor (*Dryobalanops aromatica*)
Clary Sage (*Salvia sclarea*)
Clove Bud (*Syzygium aromaticum*, formerly *Eugenia caryophyllata*)
Clove Bark (*Dicypellium caryophyllatum*)
Coriander (*Coriandrum sativum*)
Cumin (*Cuminum cyminun*)
Cypress (*Cupressus sempervirens*)
Eucalyptus (*Eucalyptus globulus*)
Eucalyptus Australiana (*E. australiana*)
Lemon Eucalyptus (*E. citriodora*)
Dives or Broad-Leaved Peppermint (*E. dives*)
Peppermint Eucalyptus (*E. piperita*)
Blue Mallee (*E. polybractea*)
Grey Peppermint (*E. radiata*)
Gully Gum (*E. smithii*)
Fennel (*Foeniculum vulgare*)
Dill (*Anethum graveolens*)
Fir (*Abies alba* and other species)
Canadian Balsam (*A. balsamea*)
Siberian Fir (*A. siberica*)
Hemlock (*Tsuga canadensis*)
Pine (*Pinus species*)
Black Spruce (*Picea mariana*)
Terebinth (*P. palustris*, etc.)
Frankincense (*Boswellia carterii*)
Olinbaum (*B. papyrifera*)
Elemi (*Canarium luzonicum*)
Galbanum (*Ferula galbaniflua*)
Asafetida (*F. asafoetida*)
Zalou Root (*F. hermonic*)
Musk Root (*F. sumbal* and *F. gummose*)
Silhion (*F. species*)
Geranium (*Pelargonium graveolens*)
Zdravets (*Geraniurm macrorhizum*)
Ginger (*Zingiber officinale*)
Galanga (*Alpina officinalis*)
Helichrysum (*Helichrysum angustifolium*)
Hyssop (*Hyssopus officinalis*)
Hyssop (*H. officinalis* var. *decumbens*)
Inula, Sweet (*Inula graveolens*, or *I. odorata*)
Inula (*I. helenium*)
Jasmine (*Jasminum officinale* and *J. grandiflorum*)
Jasmine Sambac (*Jasminun officianalis sambac*)
Chinese Jasmine (*J. sambac*)
Juniper (*Juniperus communis*)
Cedarwood, Virginia (*J. virgiiana*)
Oil of Cade (*Juniper Tar*)
Labdanum (*Cistus labdaniferus*)
Cistus (*C. incanus*)
Lavender (*Lavandula angustifolia*, previously *L. vera* and *L. officinale*)
Lavandin (*L. x intermedla* or *L. x hybrida*)

TABLE 1-continued

Spike Lavender (*L. latifolia*)
Stoechas Lavender (*L. stoechas*)
Lemon (*Citrus limon*)
Cedro Oil
Lemongrass (*Cymbopogan citratus*)
Palmarosa (*C. martini*)
Petitgrain (*Citrus aurantium*)
Ravensara Aromatica (*Cinnamomum camphora*)
Lemongrass Cochin (*C. flexuosus*)
Citronella (*C. nardus*)
Java Citronella (*C. winterianus*)
Lovage (*Levisticum officinale*)
Marjoram (*Origanum marjorana* or *Marjorana hortensis*)
Oregano (*O. vulgare*)
Spanish Marjoram (*Thymus mastichina*)
Spanish Oregano (*T. capitatus*)
Melissa (*Melissa officinalis*)
Lemon Verbena (*Aloysia triphylla*, formerly *Lippia citriodora*)
Mimosa (*Acacia decurrens* var. *dealbata*)
Cassie (*A. farnesiana*)
Myrrh (*Commiphora myrrha*)
Opopanax (*Illicium verum*)
Copaiba Balsam (*Copaiba officinalis*)
Myrtle (*Myrtus communis*)
Nutmeg (*Myristica fragrans*)
Niaouli (*Melaleuca viridflora*)
Palma Rosa (*Cymbapogon Martini*)
Oakmoss (*Evernia prunastri*)
Tree Moss (*E. furfuracea*)
Orange (*Citrus sinensis, Citrus aurantium*)
Neroli (*Citrus aurantium*)
Neroli Portugal (*C. aurantium* var. *dulcis*)
Neroli sur Petitgrain (*Citrus aurantiumflowers*)
Bergamot (*Citrus bergamia*)
Bitter Orange (*C. aurantium* var. *amara*)
Grapefruit (*C. x paradisi*)
Mandarine (*Citrus nobilis*)
Tangerine (*Citrus reticulata*)
Pink Grapefruit (*Citrus paradisii*)
Lime (*C. aurantiifolia*)
Orange Blossom (*Neroli, Citrus aurantium* var. *amara*)
Patchouli (*Pogostemon cablin*)
Pepper, Black (*Piper nigrum*)
Litsea (*Litsea cubeba*)
Cubeb (*Piper cubeba*)
Californla Pepper Tree (*Schinus moule*)
Mastic (*Pistacia lentiscus*)
Peppermint (*Mantha piperita*)
Ravensare (*Ravensara aromatica*)
Rose Otto (*Rosa damascena, R. gallica,* and others)
Cabbage Rose (*R. centifolia*)
Rosemary (*Rosmarinus officinalis*)
Rosmarinus Pyramidalis (*R. pyramidalis*)
Rosewood (*Aniba rosaeodora*)
Sage (*Salvia officinalis*)
Spanish Sage (*S. lavandulaefolia*)
Sandalwood (*Santalum album*)
Spearmint (*Mentha Spicata*)
Black Spruce (*Picia Mariana*)
Tagetes (*Tagetes glandulifera*)
Amyris (*Amyris balsamifera*)
Spikenard (*Nardostachys jatamansi*)
Valerian (*Valeriana officinalis*)
Kesso Root (*V. officinalis* var. *latifolia*)
Tea Tree (*Melaleuca alternifolia*)
Cajeput (*M. cajuputii, M. quinquenervia*)
Niaouli (*M. viridiflora*)
Thyme (Red Thyme, White Thyme) (*Thymus vulgaris*)
Thyme, var linalol (*Thymus vulgaris linalool*)
Moroccan Thyme (*T. satureioides*)
Spanish Marjoram (*T. mastichina*)
Spanish Oregano (*T. capitatus*)
Tuberose (*Polianthes tuberosa*)
Vanilla (*Vanilla planifolia*)
Vetiver (*Vetiveria zizanoides*)
Violet (*Viola adorata*)
Orris (*Iris germanica* var. *florentina*)
Yarrow (*Achillea millefolium*)
Ylang-Ylang (*Cananga odorata*)
Champac (*Michelia champaca*)
Cajeput (*Melaleuca leucadendron*)
Cistus (Rock Rose) (*Cistus landaniferus*)
Clary Sage (*Salvia sclarea*)
Clove Rud (*Eugenia carophyllata*)
Elemi (*Canarium luzonicum*)
Fir Needle (*Abies balsamea canadensis*)
Rose Geranium (*Pelargonium roseum*)
Helichrysum (*Helichrysum Italicum, Helichrysum augustifolia*)
Lavandin, Super (*Lavandula hybrid* var. *super*)
Manuka (*Leptospermum scoparium*)

The surfactant is typically present in an amount from about 10% to about 40%, and preferably from about 10% to about 20% by total weight of the anhydrous flavor delivery composition. Non-limiting examples of suitable surfactants include propylene glycol alginate, monoglyceride, diglyceride, dioctyl sulfosuccinate sodium (DOSS), polyoxyethylene (20) sorbitan monolaurate, polyoxyethylene (20) sorbitan monopalmitate, polyoxyethylene (20) sorbitan monostearate, polyoxyethylene (20) sorbitan tristearate, polyoxyethylene (20) sorbitan monooleate, sorbitan monolaurate, sorbitan monopalmitate, betaine, sucrose esters of fatty acids, sucrose monomyristate, sucrose palmitate, sucrose stearate, mono and diglycerides of fatty acids, monoglyceride monooleate, monoglyceride monolaurate, monoglyceride monopalmitate, lecithin, diglyceride mixtures, citric acid esters of mono and diglycerides of fatty acids, acetic acid esters of mono and diglycerides of fatty acids, lactic acid esters of mono and diglycerides of fatty acids, mono and diacetyl tartaric esters of mono and diglycerides of fatty acids, polyglycerol esters of fatty acids, cyclodextrins ($\alpha$, $\beta$, or $\gamma$), propylene glycol esters of fatty acids, stearoyl lactylates, $C_{8-18}$ free fatty acids, other emulsifiers as is known to those skilled in the art, and combinations thereof.

The alcohol of the present invention is typically present in an amount from about 55% to about 85%, preferably from about 63% to about 73% by total weight of the anhydrous flavor delivery composition. The preferred alcohol is ethanol. In addition, other alcohols that can be used include, without limitation, isopropanol; methanol, benzyl alcohol; propylene glycol (as $CH_2OH$—$CH_2$—$CH_2OH$ and/or $CH_3$—$CHOH$—$CHOH$); butylene glycol; hexylene glycol; glycerol; $C_5$-$C_{12}$ mono- and di-saccharide sugars, such as, dextrose, sucrose, fructose, as such, or in other forms such as molasses, brown sugar, invert sugar, refinery syrup, corn syrup; and sugar alcohols such as sorbitol, xylitol and mannitol.

Unexpectedly, it was discovered that the water-insoluble component dissolves more readily in ethanol than in propylene glycol. Additionally, the resulting anhydrous flavor delivery composition is typically clear even when the ratio of ethanol to the surfactant exceeds 1:1. Unlike ethanol, other alcohols such as propylene glycol will typically result in a cloudy anhydrous flavor delivery composition if the ratio of the alcohol to the surfactant exceeds 1:1.

The weight ratio of the surfactant to the water-insoluble component is typically from about 0.025:1 to about 4:1 and a more typical ratio is from about 0.5:1 to about 2:1. The weight ratio of the alcohol to the surfactant is typically from about 1.375:1 to about 8.5:1 and a more typical ratio is from about 2:1 to about 4:1.

In another embodiment of the present invention, the anhydrous flavor delivery composition can include an effective amount of a suitable preservative. Any suitable preservative can be used. Non-limiting examples of suitable preservative include benzoate salts, sorbate salts, as well as other preservatives known to those skilled in the art, and combinations thereof. Those skilled in the art will appreciate that the preservative can be combined with an acid such as citric acid to lower its pH improving the effectiveness of the preservative.

In accordance with another aspect of the present invention, a method of making an anhydrous flavor delivery composition is provided. Preferably, the components and amounts in the resulting flavor delivery composition are as previously described. The method comprises combining a water-insoluble component, a surfactant, and an alcohol to form an anhydrous flavor delivery composition. Preferably, the anhydrous flavor delivery composition is optically clear and stable. It was discovered that the sequence of adding a water-insoluble component to a surfactant to form a mixture, and then adding an alcohol to the mixture to form an anhydrous flavor delivery composition provides the most stable microemulsion. Those skilled in the art will appreciate that this method can be done in a batch, a semi-continuous, or a continuous process.

In one embodiment of the present invention, the water-insoluble component can be added to the surfactant under continuous stirring or other mixing techniques known to those skilled in the art. Likewise, the alcohol is preferably added to the mixture of the water-insoluble component and the surfactant under continuous stirring or other mixing techniques known to those skilled in the art.

In accordance with yet another aspect of the present invention, a method of flavoring a beverage composition is provided. The method comprises adding an effective amount of a flavor delivery composition to a beverage composition. Preferably, the components and amounts of the flavor delivery composition are as previously described.

In one embodiment of the present invention, the resulting beverage composition is stable and optically clear.

EXAMPLE

| Ingredient | Example 1 (Parts by Weight) |
|---|---|
| Lemon-Lime Oil | 18.0 |
| Polysorbate 60 | 13.5 |
| Ethanol | 68.5 |
| Total | 100.0 |

The anhydrous flavor delivery composition of Example 1 was prepared by mixing lemon-lime oil and polysorbate 60 under continuous stirring to form a mixture. Then, ethanol was added to the resulting mixture under continuous stirring.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. An anhydrous flavor delivery composition for a beverage comprising: from about 1% to about 40% of a water insoluble component by total weight of the anhydrous flavor delivery composition; from about 10% to about 40% of a surfactant by total weight of the anhydrous flavor delivery composition; from about 55% to about 85% of a monohydric alcohol by total weight of the anhydrous flavor delivery composition; and wherein the alcohol:surfactant ratio is from about 1.375:1 to about 8.5:1, wherein the water-insoluble component comprises at least one edible oil and wherein the anhydrous flavor delivery composition provides a microemulsion.

2. The anhydrous flavor delivery composition according to claim 1 wherein the edible oil is selected from the group consisting of triacylglycerol oil, lemon oil, orange oil, bitter orange oil, grapefruit oil, mandarine oil, tangerine oil, pink grapefruit oil, lime oil, orange blossom oil, peppermint oil, spearmint oil, wintergreen oil, vanilla oil, coffee oil, tea oil, cherry oil, apple oil, pineapple oil, and combinations thereof.

3. The anhydrous flavor delivery composition according to claim 1 wherein the surfactant is selected from the group consisting of propylene glycol alginate, monoglyceride, diglyceride, dioctyl sulfosuccinate sodium, polyoxyethylene (20) sorbitan monolaurate, polyoxyethylene (20) sorbitan monopalmitate, polyoxyethylene (20) sorbitan monostearate, polyoxyethylene (20) sorbitan monooleate, sorbitan monolaurate, sorbitan monopalmitate, betaine, mono and diglycerides of fatty acids, lecithin, diglyceride mixtures, citric acid esters of mono and diglycerides of fatty acids, acetic acid esters of mono and diglycerides of fatty acids, lactic acid esters of mono and diglycerides of fatty acids, mono and diacetyl tartaric esters of mono and diglycerides of fatty acids, polyglycerol esters of fatty acids, propylene glycol esters of fatty acids, stearoyl lactylates, and combinations thereof.

4. The anhydrous flavor delivery composition according to claim 1 wherein the weight ratio of the surfactant to the water-insoluble component is from about 0.25:1 to about 4:1.

5. The anhydrous flavor delivery composition according to claim 1 further comprising a preservative for the anhydrous flavor delivery composition.

6. The anhydrous flavor delivery composition according to claim 1 wherein the flavor delivery composition is optically clear.

7. The anhydrous flavor delivery composition according to claim 6 wherein the monohydric alcohol is selected from the group consisting of ethanol, methanol, isopropanol, benzyl alcohol, and combinations thereof.

8. The anhydrous flavor delivery composition according to claim 7 wherein the surfactant is a polysorbate.

9. A method of making an anhydrous flavor delivery composition, the method comprising: providing a water insoluble component in an amount from about 1% to about 40% by total weight of the anhydrous flavor delivery composition; providing a surfactant in an amount from about 10% to about 40% by total weight of the anhydrous flavor delivery composition; mixing the water insoluble component with the surfactant to form a mixture; and adding to the mixture from about 55% to about 85% by total weight of the anhydrous flavor delivery composition of a monohydric alcohol to form a non-aqueous mixture; wherein the alcohol:surfactant ratio is from about 1.375:1 to about 8.5:1, wherein the water-insoluble component comprises at least one edible oil and wherein the anhydrous flavor delivery composition provides a microemulsion.

10. The method of claim 9 wherein the edible oil is selected from the group consisting of triacylglycerol oil, lemon oil, orange oil, bitter orange oil, grapefruit oil, mandarine oil, tangerine oil, pink grapefruit oil, lime oil, orange blossom oil, peppermint oil, spearmint oil, wintergreen oil, vanilla oil, coffee oil, tea oil, cherry oil, apple oil, pineapple oil, and combinations thereof.

11. The method of claim 9 wherein the surfactant is selected from the group consisting of propylene glycol alginate, monoglyceride, diglyceride, dioctyl sulfosuccinate sodium, polyoxyethylene (20) sorbitan monolaurate, polyoxyethylene (20) sorbitan monopalmitate, polyoxyethylene (20) sorbitan monostearate, polyoxyethylene (20) sorbitan monooleate, sorbitan monolaurate, sorbitan monopalmitate, betaine, mono and diglycerides of fatty acids, lecithin, diglyceride mixtures, citric acid esters of mono and diglycerides of fatty acids, acetic acid esters of mono and diglycerides of fatty acids, lactic acid esters of mono and diglycerides of fatty acids, mono and diacetyl tartaric esters of mono and diglycerides of fatty acids, polyglycerol esters of fatty acids, propylene glycol esters of fatty acids, stearoyl lactylates, and combinations thereof.

12. The method of claim 9 wherein the weight ratio of the surfactant to the water-insoluble component is from about 0.25:1 to about 4:1.

13. The method of claim 9 further comprising adding a preservative to the non-aqueous mixture.

14. The method of claim 9 wherein the flavor delivery composition is optically clear.

15. The method of claim 14 wherein the monohydric alcohol is selected from the group consisting of ethanol, methanol, isopropanol, benzyl alcohol, and combinations thereof.

16. The method of claim 15 wherein the surfactant is a polysorbate.

17. A method of flavoring a beverage comprising adding an effective amount of a flavor delivery composition to a beverage composition, said flavor delivery composition comprising: from about 1% to about 40% of a water insoluble component by total weight of the anhydrous flavor delivery composition; from about 10% to about 40% of a surfactant by total weight of the anhydrous flavor delivery composition; from about 55% to about 85% of a monohydric alcohol by total weight of the anhydrous flavor delivery composition; and wherein the alcohol:surfactant ratio is from about 1.375:1 to about 8.5:1, wherein the water-insoluble component comprises at least one edible oil and wherein the anhydrous flavor delivery composition provides a microemulsion.

18. The method of claim 17 wherein the flavor delivery composition is optically clear.

19. The method of claim 18 wherein the monohydric alcohol is selected from the group consisting of ethanol, methanol, isopropanol, benzyl alcohol, and combinations thereof.

20. The method of claim 18 wherein the surfactant is a polysorbate.

21. An anhydrous flavor delivery composition for a beverage comprising: from about 1% to about 40% of a water insoluble component by total weight of the anhydrous flavor delivery composition; from about 10% to about 40% of a surfactant by total weight of the anhydrous flavor delivery composition; from about 55% to about 85% of an alcohol by total weight of the anhydrous flavor delivery composition; and wherein the alcohol:surfactant ratio is from about 1.375:1 to about 8.5:1, wherein the water-insoluble component comprises at least one edible oil, wherein the alcohol is a monohydric alcohol selected from the group consisting of ethanol, methanol, isopropanol, benzyl alcohol, and combinations thereof, and wherein the anhydrous flavor delivery composition provides a microemulsion.

22. The anhydrous flavor delivery composition according to claim 21 wherein the alcohol is ethanol.

23. The anhydrous flavor delivery composition according to claim 21 from about 63% to about 73% of the alcohol by total weight of the anhydrous flavor delivery composition.

24. The anhydrous flavor delivery composition according to claim 1 comprising from about 63% to about 73% of the alcohol by total weight of the anhydrous flavor delivery composition.

25. The method according to claim 9 wherein the flavor delivery composition comprises from about 63% to about 73% of the alcohol by total weight of the anhydrous flavor delivery composition.

* * * * *